United States Patent [19]
Mayer et al.

[11] Patent Number: 6,018,987
[45] Date of Patent: Feb. 1, 2000

[54] APPARATUS FOR MEASURING GAS TRANSMISSION THROUGH CONTAINER CLOSURES

[75] Inventors: Daniel W. Mayer, Wyoming; Robert L. Neiss, St. Michael, both of Minn.

[73] Assignee: Mocon, Inc., Minneapolis, Minn.

[21] Appl. No.: 09/128,601

[22] Filed: Aug. 3, 1998

[51] Int. Cl.⁷ ................................................. G01M 3/34
[52] U.S. Cl. ............................................................ 73/49.2
[58] Field of Search ..................................... 73/49.2, 49.3, 73/52, 49.8

[56] References Cited

U.S. PATENT DOCUMENTS

| | | | |
|---|---|---|---|
| 4,852,415 | 8/1989 | Bogatzki et al. | 73/865.8 |
| 5,319,957 | 6/1994 | Stieger et al. | 73/49.2 |
| 5,591,899 | 1/1997 | Griesbeck | 73/41 |

*Primary Examiner*—Michael Brock
*Attorney, Agent, or Firm*—Paul L. Sjoquist

[57] ABSTRACT

A fixture for holding a plastic or glass container and container closure member in a fixed position for measurement of the gases escaping through and around the closure member. A first clamp positions a closure cover over the closure member, and a second clamp positions a slidable yoke about the bottle neck, wherein the first and second clamps are sealably affixed together; the closure cover has a gas passageway for purging the gas from the chamber formed by the two clamps, and for collecting gas leaking through the closure member.

10 Claims, 2 Drawing Sheets

APPARATUS FOR MEASURING GAS TRANSMISSION THROUGH CONTAINER CLOSURES

BACKGROUND OF THE INVENTION

The present invention relates to a fixture for enabling the measurement of carbon dioxide ($CO_2$) or other gases that can flow through or leak from container closures; more particularly, the invention relates to an apparatus for securely holding a container and for sealing about the container neck and closure cap to facilitate the measurement of carbon dioxide or other gases which escape through the closure.

Certain apparatus for measuring vapor flow rates using particular sensor devices are known in the prior art. One type of sensor device typically provides an infrared signal variation if a chamber in response to the presence of carbon dioxide gas in the chamber. One such detector is disclosed in U.S. Pat. No. 3,901,820, Aug. 26, 1975, "Pressure Modulated Gas Measuring Method and Apparatus."

Other types of sensors utilize predetermined wavelengths of radiated energy to detect the presence of certain vapors or gases, as for example, coulimetric detectors for detecting the presence of oxygen.

It is usually desirable to make measurements with these devices under equilibrium conditions, where a vapor or gas is confined within the container, and a vapor or gas detector is connected to a chamber which encloses the container, and an inert carrier gas such as nitrogen is passed through the chamber to convey the leakage vapor or gas to a sensor capable of measuring small quantities of leakage gas. The overall objective of such tests is to obtain a quantitative value which provides a measure of the effectiveness of the container to retain the gases it initially holds. For example, a soft drink container is initially filled with a quantity of liquid and carbon dioxide gas to provide the carbonization associated with a fresh soft drink. The ability of the container to retain the carbon dioxide gas controls the shelf life of the soft drink, for the soft drink tastes flat after a sufficient quantity of the carbon dioxide gas has escaped from inside the container.

It can be appreciated that glass containers which were formerly widely used in the soft drink and related industries provided an exceedingly long shelf life for the products they contained. Leakage of carbon dioxide from these containers is limited to leakage around the closure cap, which typically is very insubstantial. More recently, use of plastic containers for soft drinks has provided a renewed interest in measuring the rate at which carbon dioxide escapes from containers. Further, use of new and different closure caps in combination with plastic containers has also presented new problems in measuring the amount of gas which escapes from the closure cap and the closure cap seal against the plastic container. The newest form of soft drink container frequently has a plastic bottle with a threaded neck, and a threaded closure cap tightened over the threaded neck to seal the bottle. It has become necessary to measure the gas leakage through the body of the plastic container, and also leakage through the closure cap and the region around the closure cap seal against the container.

SUMMARY OF THE INVENTION

The present invention comprises a container closure fixture having an adjustable neck clamp for sealably closing about the neck of the container, and an adjustable closure clamp for sealably attaching a test chamber about the closure cap of the container. The test chamber includes a closure hood which surrounds the closure cap, and includes passages for withdrawing samples of the gas from within the test chamber for conveying to a gas detector for analysis.

It is a principal object and advantage of the present invention to provide an apparatus for capturing the gases escaping from a container closure cap, for measuring the amount of such gases which have escaped.

It is another object and advantage of the present invention to provide a gas detector device for container closure caps which in non-destructive to the cap seal against the container.

Other and further objects and advantages of the invention will become apparent from the following specification and claims and with reference to the appended drawings.

DESCRIPTION OF THE PREFERRED EMBODIMENT

Figure 1:
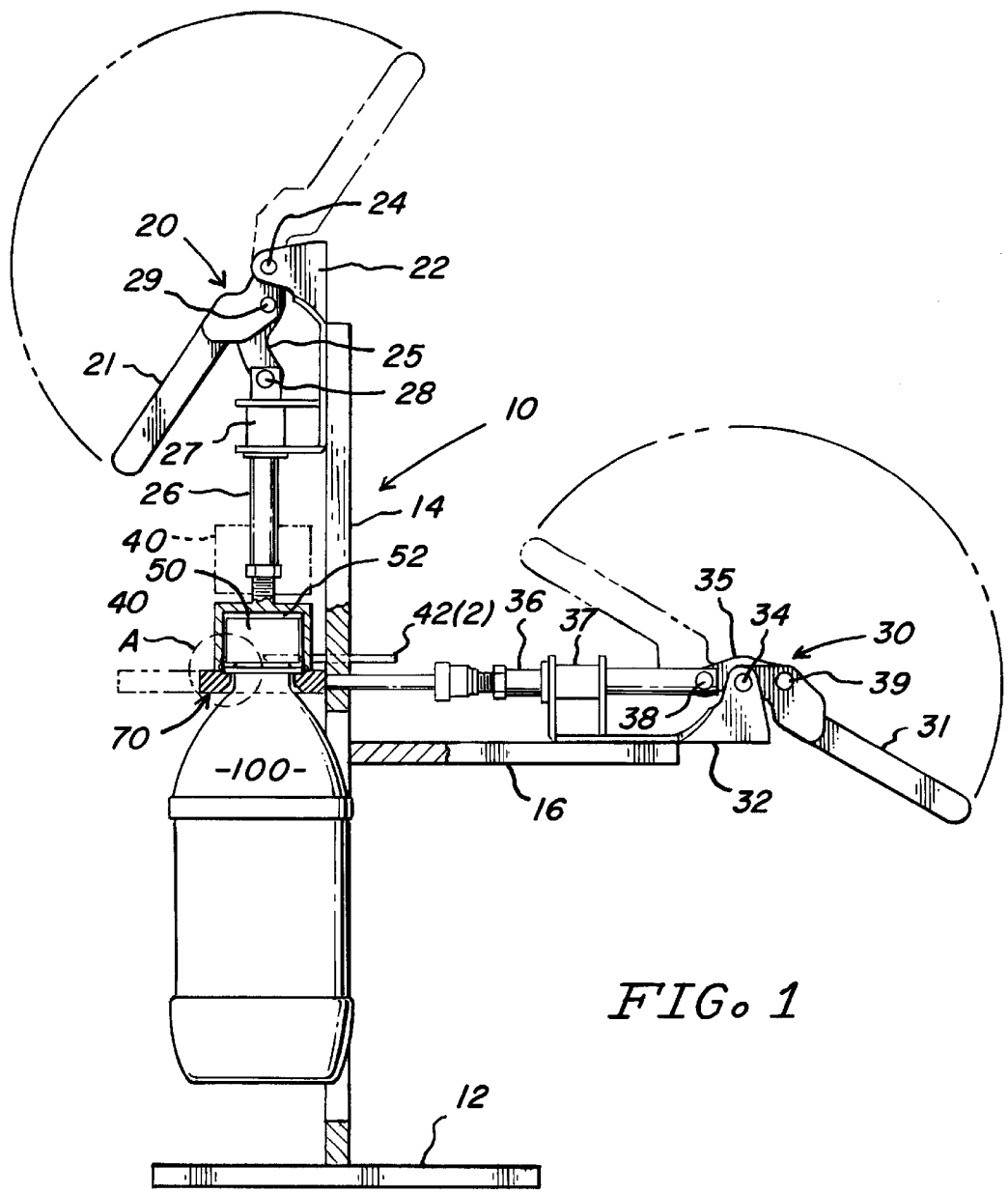
FIG. 1 shows an elevation view, in partial cross section, of the invention affixed to a container.

Referring first to FIG. 1, the invention is shown in elevation view and in partial cross section. The container closure fixture 10 is mounted on a base frame member 12, and includes a vertical brace 14 and a horizontal brace 16. A closure clamp 20 is mounted to vertical brace 14, and a neck clamp 30 is mounted to horizontal brace 16. A bottle or plastic container 100 having a closure cap 50 may be mounted to the fixture 10 in the position shown in FIG. 1, by being clamped from two directions by closure clamp 20 and closure clamp 30. In the clamped position, the closure cover 40 forms a chamber which totally encloses the container closure cap 50, and which provides an isolation chamber 52 around the closure cap 50 for collecting the gases which have escaped from the container interior through the closure cap and the seal between the closure cap and the container. Two gas passages 42 are provided to the interior of the closure cover, opening into the chamber 52, to provide the means for passing an inert gas such as nitrogen through the chamber 52 for purging the chamber before the gas measurement operation begins, and for conveying the escaped gas which accumulates in the chamber 52 to an outside detector (not shown) for measurement.

The closure clamp 20 and the neck clamp 30 each operate in a very similar fashion. Closure clamp 20 has a handle 21 which is pivotally mounted about bracket 22 at pin 24. A plunger 26 is guided within a sleeve 27 and is therefore constrained to a vertical movement. A link 25 is pivotally attached at one of its ends to plunger 26 via pin 28, and is pivotally attached at its other end to handle 21 via pin 29. By rotating handle 21 clockwise about pin 24 as shown in FIG. 1, plunger 26 is caused to slide upwardly, and closure cover 40 is raised from its covering position over closure cap 50 to a raised position. Conversely, rotating handle 21 counterclockwise causes closure cover 40 to become lowered in covering relationship to closure cap 50.

Neck clamp 30 is mounted to a bracket 32 affixed to horizontal brace 16. Neck clamp 30 has a handle 31 which is pivotally mounted to bracket 32 via a pin 34. A plunger 36 is connected to a neck seal collar 70, and is guided within a sleeve 37, and is therefore constrained to a horizontal movement. A link 35 is pivotally attached at one of its ends to plunger 36 via pin 38, and is pivotally attached at its other end to handle 31 via pin 39. By rotating handle 31 clockwise about pin 34 as shown in FIG. 1, plunger 36 is caused to slide horizontally rightward, and the neck seal collar 70 is opened. Conversely, rotating the handle 31 counterclockwise caused plunger 36 to slide horizontally leftward, and neck seal collar 70 is closed.

It is a characteristic of nearly all plastic containers shaped as bottles that they have a reduced-diameter neck with a threaded upper end for receiving a closure cap. Plastic bottles also have a circumferential projecting flange 62 in the reduced-diameter neck which is called a fill ring; in some cases, this fill ring supports the plastic bottle during the filling operation. These features, and other features, are shown in expanded detail in FIG. 2. The chamber 52 extends about the top and sides of the closure cap 50, and also extends in the region beneath closure cap 50 and above flange 62, and isolated by O-ring 80. Two passages 42 open into this chamber 52, one of the passages 42 being connectable (not shown) to a source of inert gas and the other passage being connectable to a gas detector.

Figure 2:
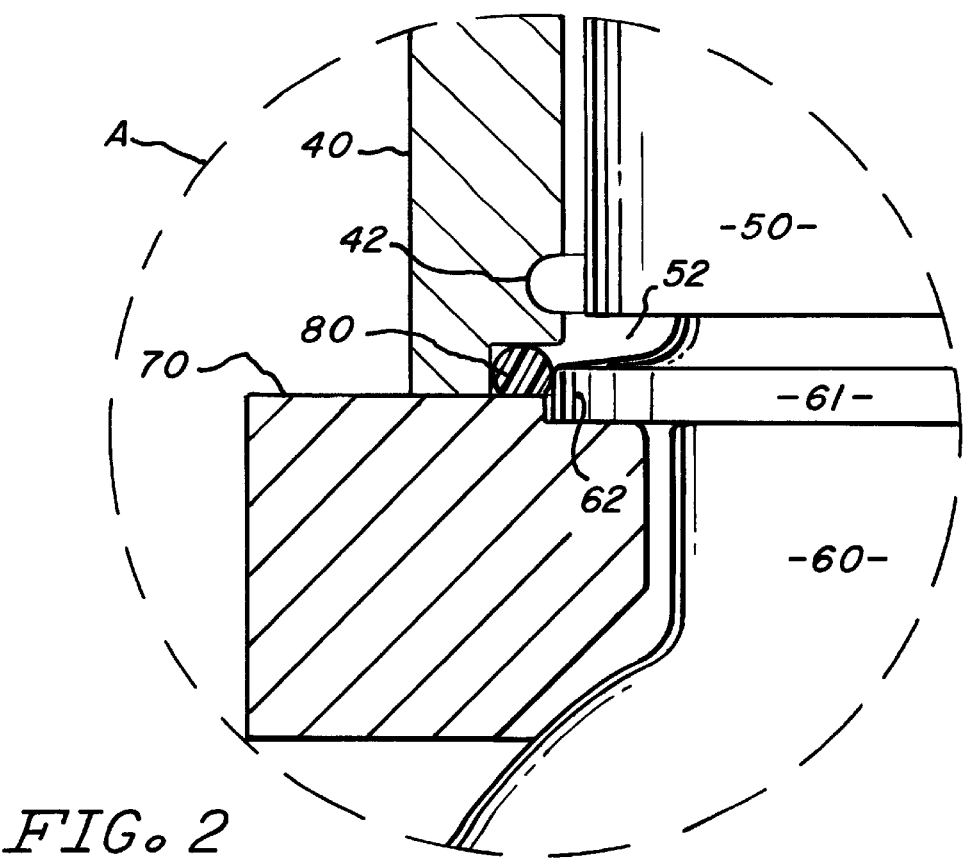
FIG. 2 shows an expanded view of the portion of FIG. 1 enclosed by the dotted circle A.
Figure 3:
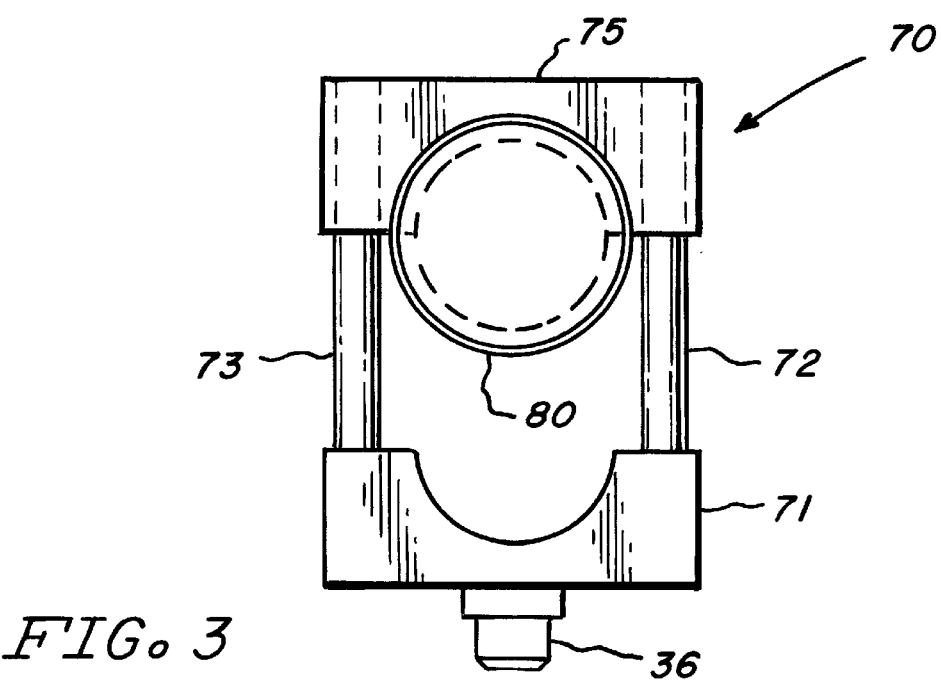
FIG. 3 shows a top view of the neck sealing collar.

Neck seal collar 70 is shown in greater detail in FIG. 3. The plunger 36 is attached to a movable yoke 71, which is slidable over guide bars 72 and 73. Guide bars 72 and 73 are affixed to yoke 75. The inner edges of yokes 71 and 75 are formed into a circular shelf pattern, sized to fit about the neck of a standard-size bottle, with the bottle fill ring resting on the circular shelf formed by the two yokes. An O-ring 80 is seated along the interior edge of the circular shelf pattern, for sealing against the container flange 62. FIG. 2 shows an expanded view of the mounting relationship of the container closure 50, the container neck 60, the container flange 62, the closure cover 40 and the neck seal collar 70. The neck seal collar 70 is fitted about the container neck 60, with the container flange 62 about container fill ring 61 resting on the circular shelf along the inner edges of yokes 71 and 75. The O-ring 80 extends about the outer edge of the container neck 60 and flange 62. The closure clamp 20 is moved downwardly to clamp against the O-ring 80 and the seal collar 70, leaving the closure cover 40 sealably connected about the container closure member 50, and sealably connected to the container fill ring 61. A pair of gas passages 42 project through the closure cover 40; one gas passage 42 may be connected to the detector and sensing apparatus which is used in conjunction with the invention, to measure the gas quantities escaping from the bottle closure cap, and the other gas passage 42 may be connected to a source of inert carrier gas.

The present invention may be embodied in other forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. An apparatus for sealably mounting a bottle having a fill ring and a closure cap fitted over a closure cap region above the fill ring, for measuring the gaseous leakage through the closure cap region, comprising:

a) a fixture having respective horizontal and vertical braces thereon;

b) an adjustable clamp mounted on each of said horizontal and vertical braces, each of said adjustable clamps having a movable plunger capable of being locked into a fixed positon;

c) a positionable collar attached to one of said movable plungers, said collar having means for supporting the fill ring of said bottle;

d) a closure cover attached to the other of said movable plungers, said closure cover being movable to completely overlie the closure cap of said bottle, and be movable to become sealably positioned against said positionable collar.

2. The apparatus of claim 1, further comprising an O-ring circumferentially seated about said fill ring beneath said closure cover, whereby to seal the contact region between said closure cover and said positionable collar.

3. The apparatus of claim 2, further comprising a gas passage through said closure cover, and means for connecting said gas passage to a source of inert gas.

4. The apparatus of claim 3, wherein each of said adjustable clamps further comprise a plunger slidable along a linear path of travel, and means for locking said plunger in a fixed position.

5. An apparatus for holding a container and container closure in fixed position for measuring gas leakage through the closure, comprising a) a container neck clamp which is positionable about the neck of said container, and lockable into a fixed position; and b) a closure cover movably positionable over said container closure and said container neck clamp, and lockable into a fixed position against said container neck clamp; and c) means for sealing said container neck clamp and said closure cover together, thereby to provide a sealed chamber for the collection of gases leaking through said closure and through the region between said closure and said neck.

6. The apparatus of claim 5, wherein said closure cover further comprises a gas passageway.

7. The apparatus of claim 6, wherein said container neck clamp further comprises a circular groove for receiving an O-ring, and said closure cover further comprises a groove for receiving said O-ring, and said means for sealing further comprises said O-ring.

8. The apparatus of claim 7, wherein each of said closure cover and said container neck clamp further comprise a clamp having a link pivotally connected to a handle, wherein said handle is separately pivotally connected to a bracket, each of said handles connected to a slidable member; one of said slidable members being connected to said closure cover and the other of said slidable members being connected to said container neck clamp.

9. The apparatus of claim 8, wherein said container neck clamp further comprises a fixed yoke having a pair of slide shafts projecting therefrom, and a moveable yoke mounted to and slidable over said slide shafts, said moveable yoke being connectable to one of said slidable members.

10. The apparatus of claim 9, wherein said slidable members each further comprise a plunger slidable within a tube, said tube being affixed to said one of said brackets.

* * * * *